US010496418B2

(12) United States Patent
Huang et al.

(10) Patent No.: US 10,496,418 B2
(45) Date of Patent: Dec. 3, 2019

(54) METHOD FOR ASSEMBLING ANDROID APPLICATION BASED ON APPLICATION CONTENT

(71) Applicant: Peking University, Beijing (CN)

(72) Inventors: Gang Huang, Beijing (CN); Xuanzhe Liu, Beijing (CN); Yi Liu, Beijing (CN); Yun Ma, Beijing (CN); Meihua Yu, Beijing (CN); Mengwei Xu, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 15/745,167

(22) PCT Filed: Sep. 7, 2016

(86) PCT No.: PCT/CN2016/098291
§ 371 (c)(1),
(2) Date: Jan. 16, 2018

(87) PCT Pub. No.: WO2017/107569
PCT Pub. Date: Jun. 29, 2017

(65) Prior Publication Data
US 2018/0285131 A1    Oct. 4, 2018

(30) Foreign Application Priority Data

Dec. 21, 2015 (CN) .......................... 2015 1 0965139

(51) Int. Cl.
*G06F 9/46* (2006.01)
*G06F 9/445* (2018.01)
(Continued)
(52) U.S. Cl.
CPC ........ *G06F 9/44578* (2013.01); *G06F 9/4881* (2013.01); *G06F 9/54* (2013.01); *G06F 16/334* (2019.01)

(58) Field of Classification Search
None
See application file for complete search history.

(56) References Cited

U.S. PATENT DOCUMENTS

| 9,146,972 B2* | 9/2015 | Chang | G06F 16/951 |
| 2011/0225173 A1* | 9/2011 | Gulhane | G06K 9/3266 |
| | | | 707/749 |
| 2015/0052120 A1* | 2/2015 | Bhatia | G06F 16/24578 |
| | | | 707/723 |

FOREIGN PATENT DOCUMENTS

CN    103488785 B   *   2/2018

OTHER PUBLICATIONS

English Translation of CN 103488785 B (Year: 2014).*
(Continued)

*Primary Examiner* — Bradley A Teets
(74) *Attorney, Agent, or Firm* — SV Patent Service

(57) ABSTRACT

The present application discloses a method for assembling ANDROID application based on application content. The method includes: 1) a server captures page information of an ANDROID application and creates an index, and saves metadata and index information of the page to a database, wherein the metadata includes the page jump logic of the ANDROID application; 2) a client sends a keyword input by a user to the server; 3) the server obtains an application list matching the keyword from the database and returns the metadata corresponding to the application list to the client; 4) after a target ANDROID application is selected from the application list, the client launches the target ANDROID application and automatically jumps to the page corresponding to the keyword according to the page jumping logic of the target ANDROID application. The invention breaks the isolation of information and provides a more natural assembly service among ANDROID applications.

6 Claims, 1 Drawing Sheet

(51) Int. Cl.
    *G06F 16/33*     (2019.01)
    *G06F 9/48*     (2006.01)
    *G06F 9/54*     (2006.01)

(56) References Cited

OTHER PUBLICATIONS

Ma et al. "MashDroid: An Approach to Mobile-Oriented Dynamic Services Discovery and Composition by In-App Search", 2015 (Year: 2015).*

* cited by examiner

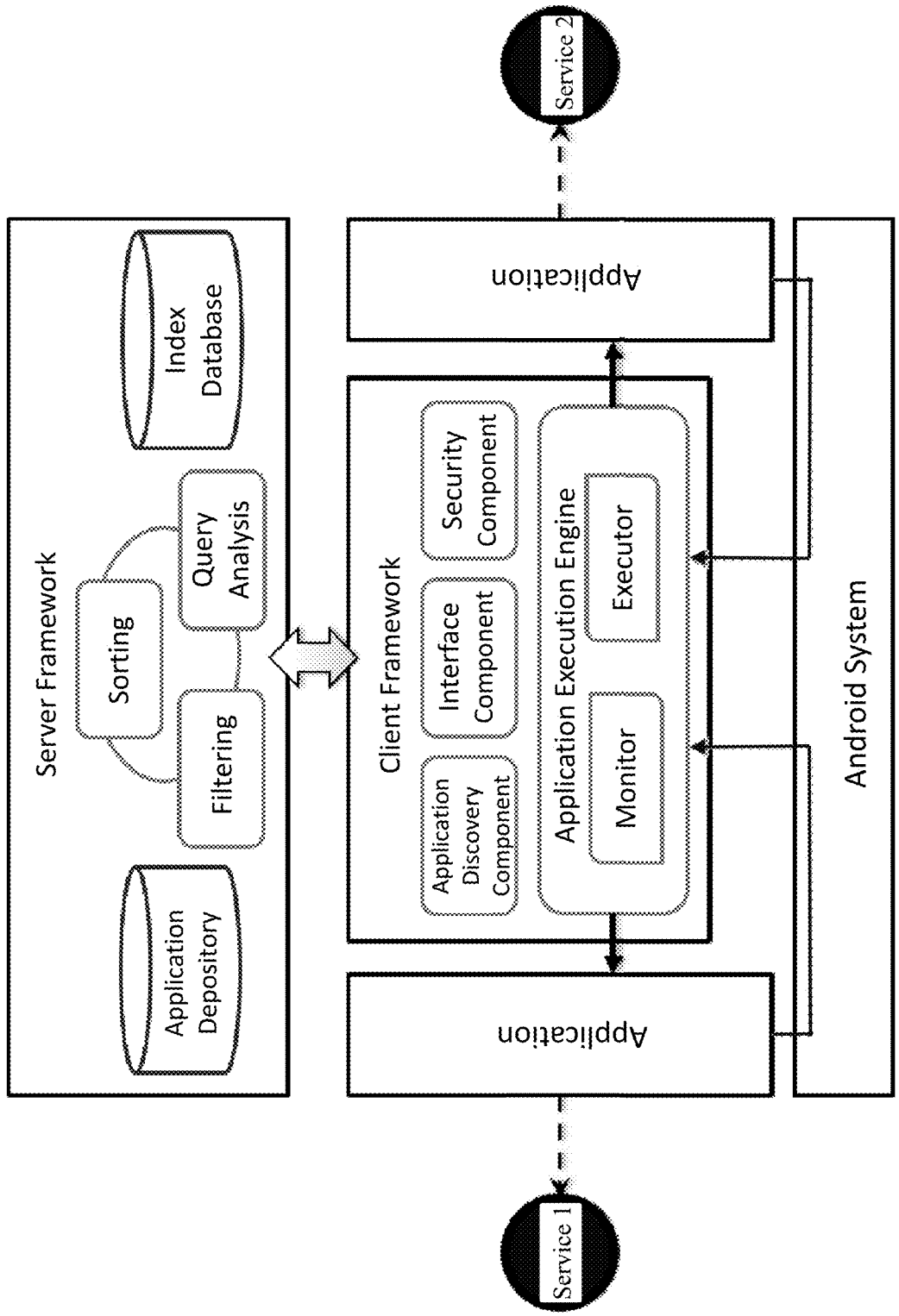

METHOD FOR ASSEMBLING ANDROID APPLICATION BASED ON APPLICATION CONTENT

TECHNICAL FIELD

The present invention relates to a method of assembling Android applications based on application content, which belongs to the technical field of software.

BACKGROUND OF THE INVENTION

"The 36th Statistical Report on the Internet Development in China" shows that as of June 2015, the number of Internet users in China has reached 668 million while the number of mobile Internet users has reached 594 million, accounting for 88.9% of the Internet users. The trend of mobile phones as the main terminals for accessing the Internet was further evident. Meanwhile, the "Research Report on Internet User Behavior in 2014" shows that by the end of June 2014, the number of search engine users in China reached 507.49 million, which accounts for 80.3% of Internet users. The number of mobile search engine users reached 405.83 million, which accounts for 77.0% of mobile Internet users. Users download a large number of applications through their smartphones, which play important roles in their daily lives, study, work, and entertainment. According to statistics, an average of 60 or even more applications are installed on each smart mobile terminal. The number of applications on each application distribution platform of Google Play and Apple Store has reached millions, with application downloads reaching tens of billions of times.

More and more people use apps installed on their mobile device to access the Internet and to a large extent, retrieve information through search engines. However, it is noticed that although search engines exist in many forms, their main source of content is from the websites. Since existing applications want to keep as many users as possible, they limit content and services in their own applications to provide unique services to attract customers. While there are a few of applications provide web-based applications that can be indexed and retrieved by search engine engines, most of the applications that mobile users heavily rely on now are in fact isolated "islands". A very simple example can illustrate the situation: when a user sees information about a movie when browsing news, the user has to open a video application, and searches for the film and watch related videos in the application; or opens a movie application, and then views the movie's playing time, venue, and other information, and purchase the movie tickets online. If the user has more complex needs, he or she may have to open a lot of applications, through tedious and redundant manual operations to achieve their goals.

SUMMARY OF THE INVENTION

In view of the problems in the conventional technologies, an object of the present invention is to provide a method of assembling Android applications based on application content to break the isolation of information among Android applications and to provide more natural assembly services among Android applications. The core idea is that the server captures contents of Android applications and indexes them through well-known technologies such as Google App Index, Wandoujia in-app search, and intercepting request data by monitoring network. The client user automatically submits the key content of selected page to the server. The server returns an application list sorted by relevancy. When the user selects and clicks the corresponding application entry, the application is launched and jumped directly to the page associated with the search keyword.

The technical scheme of the invention is as follows:

A method of assembling Android application based on application content, includes the following steps:

1) A server crawls page information using applications such as Google App Index, Wandoujia in-app search, or network monitor application, creates the indexes, and stores index information in a backend database;

2) A user selects a keyword on the client side, and submits it to the server.

3) According to the keywords submitted by the client, the server conducts word segmentation, retrieval, filtering, sorting, and so on, to obtain an application list (including an application name, an application icon and message digest of related pages) and corresponding metadata (i.e. application activation and jump logic for jumping to the relevant pages, including parameters related to constructing the Intent object) from the database. The server returns the above information to the client.

4) The client displays the returned list of applications based on the priority (in the bar display in Android notification) to present to a user.

5) When the user selects one of the Android applications in the application list, the target application is initialized through an inter-application communication mechanism such as Intent in Android. The target application automatically jumps to the Activity page corresponding to the target application and is finally displayed to the user (note that Google App Index, Wandoujia in-app search, and decompile Android applications can be used to acquire parameters to build the Intent to launch the target application and jump to the target page).

Further, step 1) includes specific steps: storing the content of the page requested by the Google App Index, the Wandoujia in-app search or the server-side monitoring network to store the content in database on the server side.

Further, the server processes the information of the Android application through stages such as word segmentation, setting up an index, to prepare for subsequent retrievals.

Further, when obtaining the search keyword selected and submitted by the client, the server performs preliminary processing such as word segmentation.

The server searches all candidate Android application lists and related information by using the TF-IDF model. In particular, the list of returned apps are filtered, rated and prioritized based on other information (the jump logic of the specified page and other descriptive information).

Further, after obtaining the application list and the corresponding description information returned by the server, the the client displayed the returned information to the user through the notification bar or a floating window. When the user clicks on an application entry, the client application uses inter-process communication mechanism in Android (Intent) to start the target application and jumps to corresponding page of the target application according to the returned jump logic (Intent configuration parameters). Finally, the target page related with the keyword is displayed to the user.

The invention is divided into two parts: the client side and the server side. The client is mainly used to interact with the user, and start the target application and jump to the specified page when the user selects the target application. Server-side services include crawling and storing Android application information, and then use the information to provide search engine services.

As shown in FIG. 1, the specific technical solutions of the above parts are as follows:

1) Client framework. The client consists of App Execution Engine (AEE) component, App Discovery (AD) component, User Interface (UI) component, and Security Enhancer (SE) component.

AEE includes a monitor and an executor. The monitor is to monitor the state of the application on the Android device, and the monitor is triggered when the monitored application launches the specified IPC publishing information. The executor is responsible for initializing Android inter-process communication mechanism (mainly to initialize Intent parameters), and specifying the appropriate data (specify parameters for directly jumping to the specified page). Afterwards, the target application is started, and it directly jumps to the target page.

The function of AD is to find applications that can be assembled on Android devices. After being triggered by AEE monitor, the key information monitored is sent from the AD component to the server, to acquire a list of sorted applications.

For example, when a user wants to search for a movie keyword, the AD component has found both Wandoujia and Maoyan Movie applications on the phone, and predicts that the user wants to read film critics and purchase movie tickets online. Thus a backend server conducts the search, returns the recommended Wandoujia and Maoyan Movie applications and other relevant information (which can directly display some critics and summary information). After the user has finished viewing the film critic information, the user clicks on the Maoyan Movie entry (icons or buttons, etc.), which jumps to the Maoyan Movie ticket page for online ticket purchasing.

The UI component is the entry for client-user interactions. After the AD component obtains the list of candidate applications, the UI component displays the application list to the user (e.g. in notification bar or floating window), which allows the user to click the item to launch the target application.

2) Server-side framework. There are two main functions of the server side: first, capturing a large number of Android application information to establish information index using technologies such as Google App Index, Wandoujia in-app search, monitoring network requests, and other well-known technology, and store content and indexes in the database; secondly, interacting with the AD Component on the client side to obtain the key word information submitted by the client AD component, performing processes such as keyword query, filtering, and sorting, and returns the final application list and related information to the client AD component.

Firstly, the term Android application (App) is a collection of resources (Resource). The access to an Android application is to access representations of the resources. The page jumps in Android applications are transfers of these representations. In fact, in Android, it can be considered that each representation corresponds to an Activity. For example, the application of DianPing (an application like Yelp) is a collection of shop resources. When a user clicks QuanJuDe shop, it jumps to the page that displays QuanJuDe shop, including address, contact information and other information. An Android application may have different kinds of resources. For example, DianPing has resources of both ordinary shops and group-purchase resources. All the shops that belong to the same category can be considered as a set of resources (ResourceSet). Each specified category of resources has a common structure (Structure). For example, movies, shops, and e-books have different resources, each having a corresponding structure. Each structure includes a lot of properties (Property). For example, the structure of the movie resources includes movie name, director, cast, and other properties.

In the keyword query, TF-IDF model is used to calculate the similarity between keyword d and each resource in the application installed on the user's mobile phone (Resource represents the content on the application's page). The keyword d is segmented to obtain a word collection $\{t_k | k = 1 \ldots n\}$, wherein n is the total number of words, $t_k$ is the k-th word in the keyword d.

We define $$TF(t_k, T_{i,j}) = \frac{n_{k,i,j}}{n_{i,j}},$$

$$IDF(T_k) = \log \frac{|R_{i,j}|}{|\{i, j | t_k \in T_{i,j}\}|},$$

wherein $R_{i,j}$ is a resource in an Android application, $T_{i,j}$ is the property value of the resource $R_{i,j}$ (examples of a property value include a summary for a movie including movie name, critics, and other information), $n_{k,i,j}$ is the number of occurrences of the word $t_k$ in $T_{i,j}$, $n_{i,j}$ is the number of all phrases in $T_{i,j}$, $|R_{i,j}|$ is the total number of $R_{i,j}$ pages, and $|\{i,j|t_k \in T_{i,j}\}|$ is the total number of pages containing $t_k$. Thus we can calculate the similarity between the keyword d and the resource $R_{i,j}$ as follows:

$$S(d, R_{i,j}) = \sum_{i=1}^{n} TF(t_k, T_{i,j}) * IDF(t_k),$$

When a similarity value is higher than a preset threshold $h_{cs}$, it can be considered that the resource of the Android application (corresponding to the page in the Android application) matches with the keyword.

In order to reduce the application number in the application list, we can filter out irrelevant resources using structure information of the resources. Users normally hope to obtain resources of similar structures. The similarity between pages of two Android applications in the application list is evaluated by using Jaccard similarity:

$$J(r, R_{i,j}) = \frac{|C_r \cap C_{i,j}|}{|C_r \cup C_{i,j}|},$$

wherein $C_r$ is a feature set of a structure corresponding to page r, $C_{i,j}$ is a feature set of structures corresponding to pages $R_{i,j}$. The numerator represents the intersection of two sets, and the denominator represents the union of the two sets. Using the Jaccard similarity calculation above, one can estimate similarities between the two resource structures. Similarly, we use another preset threshold $h_{ss}$. When the Jaccard similarity between the two resource structures is greater than the threshold value $h_{ss}$, the two resources are considered have a similar structure and will be given priority to pushing such resources.

Finally, we sort through the above list of filtered applications, leading to more relevant applications (or based on the user's selection history), to provide a better user experience. The more popular, higher-rated apps that have similar semantic and structural information are given higher priorities. Here, an indicator I with value is between 0 and 1 is used to represent the above information (ranking of suitable applications, ratings and other information to be applied to a score) for all candidate applications. Finally, we can score all the candidate applications, according to the following formula:

$$Score(d,R_{i,j})=w1*S(d,R_{i,j})+w2*J(r,R_{i,j})+w3*I(app),$$

wherein $S(d, R_{i,j}) \geq h_{cs}$, $J(r, R_{i,j}) \geq h_{ss}$, and $w1+w2+w3=1$, wherein w1, w2, and w3 are respectively the weight coefficients, I(app) is a priority value for an Android application. Using the above process, we can score all resources in the database. We only need to return applications having higher Score values to the AD component on the client side, which is presented to the user by the UI component on the client side.

Compared with the conventional technologies, the present invention has the following positive effects:

Existing technologies, such as search engines, are not capable of searching and indexing information in Android applications, resulting in Android apps becoming islands of information that cannot be combined across applications to achieve more functionality. Based on the content of the Android application, the present invention can rapidly retrieve key information in different applications simultaneously and combine to optimize the usage efficiency and experience of mobile users

BRIEF DESCRIPTION OF THE DRAWINGS

FIG. 1 is an architecture diagram of the present invention.

DETAILED DESCRIPTION OF IMPLEMENTATIONS

This section gives an example of application-based Android application assembly. This example simulates a user's actual needs in real life.

Five applications were first chosen, namely Tencent video, Maoyan movie, Zhihu, Qiongyou and NetEase news. The backend server has obtained the information of these five applications for half a month, stored in the server database, and provides services such as keyword query, filtering and sorting through the open source search engine Apache Lucene. Tomcat was used to implement a server that exposes the search service interface to clients.

We have developed an Android client that implements the client framework described above, similar to a search engine that monitors user-selected keywords. When user's selection of a keyword is monitored, the keyword is submitted to the above server. The server conducts preliminary processing of the data from the search engine and returns the result to the Android client. When the user wants to know the movie information of "Museum Night Wonder", the user enters the keyword "Museum Night Wonder" in our client and clicks "Search". The server, through the search engine, returns a list of applications and the corresponding information, such as "Museum of Wonderful Night" and the movie's information on the Maoyan movie application, news on NetEase about the movie's release information, and Film critics on the Zhihu application. The client will show Maoyan movie, NetEase news and the ZhiHu in the Android notification bar. In fact, the user wants to see the movie release information and ticket service, so the user clicks the icon of the Maoyan movie. At this time, the client has monitored that the user has selected the Maoyan movie application. Based on the jump logic and other information returned from the server, the client initializes Intent, fills in the appropriate data, and starts the Intent, which launches the Maoyan movie installed on the phone. The Maoyan movie then transfers directly to the page of the movie "Museum of Wonderful Night". The user can then browse the information and purchase a ticket.

What is claimed is:

1. A method for assembling ANDROID application based on application content, comprising:
   1) capturing page information of ANDROID applications and creating indexes by a server; saving metadata and index information of pages to a database, wherein the metadata includes page jump logic of the ANDROID applications;
   2) sending a keyword entered by a user from a client to the server;
   3) obtaining an application list matching the keyword from the database in the server; returning metadata corresponding to the application list from the server to the client; and
   4) after a target ANDROID application from the application list is selected by the user according to the returned metadata, launching the target ANDROID application by the client and automatically jumping to a page corresponding to the keyword according to the page jumping logic of the target ANDROID application,
      wherein the step of jumping to the page related with the keyword according to the page jumping logic of the target ANDROID application comprises:
      launching the target ANDROID application using the inter-process communication mechanism in ANDROID; and
      jumping to a corresponding page in the target ANDROID application.

2. The method of claim 1, wherein the step of obtaining an application list matching the keyword from the database comprises:
   obtaining an application containing a page containing the keyword from the database by the server,
   wherein the page containing the keyword is determined by the following steps:
      performing word segmentation on the keyword to obtain a word collection $\{t_k|k=1 \ldots n\}$, wherein n is the total number of words;
      calculating a similarity between keywords and each page of installed applications on client that has been stored in the server using TF-IDF model:

$$S(d, R_{i,j}) = \sum_{i=1}^{n} TF(t_k, T_{i,j}) * IDF(t_k),$$

wherein d is the keyword, $t_k$ is the k-th word after the keyword d, $$TF(t_k, T_{i,j}) = \frac{n_{k,i,j}}{n_{i,j}},$$

$$IDF(T_k) = \log \frac{|R_{i,j}|}{|\{i, j | t_k \in T_{i,j}\}|},$$

wherein $R_{i,j}$ is a resource corresponding to the page in the target ANDROID application, $T_{i,j}$ is the property value of the resource $R_{i,j}$, $n_{k,i,j}$, is the number of occurrences of the word $t_k$ in $T_{i,j}$, $n_{i,j}$ is the number of all phrases in $T_{i,j}$, $|R_{i,j}|$ is the total number of $R_{i,j}$ pages, and $|\{i,j|t_k \in T_{i,j}\}|$ is the total number of pages containing $t_k$; and using the page whose similarity value is greater than a first preset threshold $h_{cs}$ as the page containing the keyword.

3. The method of claim 2, wherein the similarity between pages of two ANDROID applications in the application list is evaluated by using Jaccard similarity:

$$J(r, R_{i,j}) = \frac{|C_r \cap C_{i,j}|}{|C_r \cup C_{i,j}|},$$

wherein $C_r$ is a feature set of a structure corresponding to page r, $C_{i,j}$ is a feature set of structures corresponding to pages $R_{i,j}$, the method further comprising:

if the similarity $J(r,R_{i,j})$ is greater than a second preset threshold value $h_{ss}$, determining that the two pages having a similar structure; and increasing priority of the ANDROID application having the page containing the keyword.

4. The method of claim 3, further comprising:
scoring each ANDROID application in the application list according to the formula:

$$\text{Score}(d,R_{i,j}) = w1*S(d,R_{i,j}) = w2*j(r,R_{i,j}) = w3*I(\text{app}),$$
and sorting ANDROID applications in the application list according to the Score values associated with respective the ANDROID applications, wherein w1+w2+w3=1, w1, w2, and w3 are respectively weight coefficients, I(app) is a priority value for an ANDROID application.

5. The method of claim 1, wherein the application list includes application names, application icons, and message digests of corresponding pages.

6. The method of claim 1, wherein the step of capturing page information of ANDROID applications comprises:
crawling page information of ANDROID applications using GOOGLE App Index, WANDOUJIA in-app search, or monitor application network request data.

* * * * *